G. C. WILTSIE.
CAN WASHER.
APPLICATION FILED MAY 31, 1919.

1,342,485.

Patented June 8, 1920.
2 SHEETS—SHEET 1.

WITNESSES

INVENTOR
G. C. WILTSIE
BY
ATTORNEYS

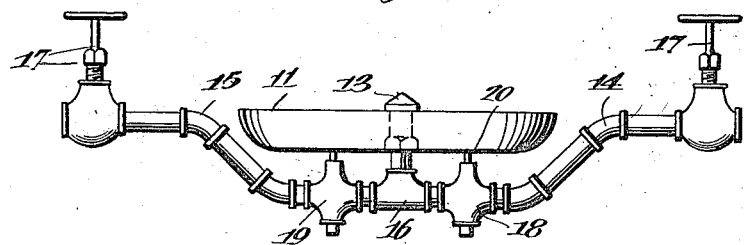
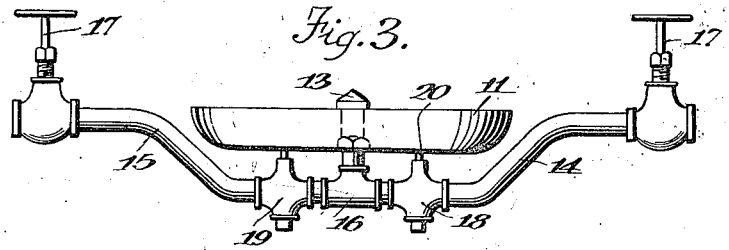
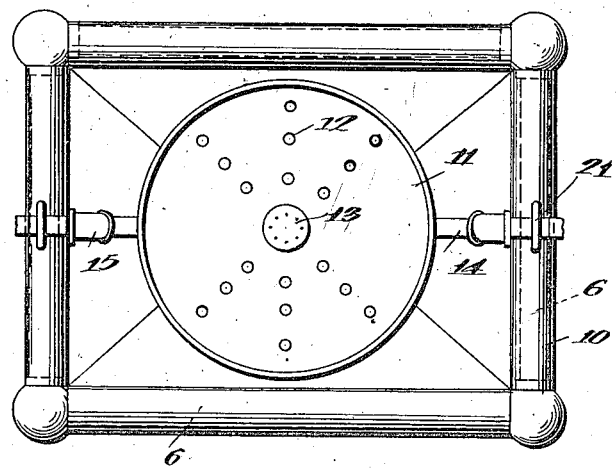

UNITED STATES PATENT OFFICE.

GEORGE CLIFFORD WILTSIE, OF SCHENECTADY, NEW YORK.

CAN-WASHER.

1,342,485.　　　　　　　　Specification of Letters Patent.　　　Patented June 8, 1920.

Application filed May 31, 1919. Serial No. 300,923.

*To all whom it may concern:*

Be it known that I, GEORGE CLIFFORD WILTSIE, a citizen of the United States, and a resident of Schenectady, in the county of Schenectady and State of New York, have invented certain new and useful Improvements in Can-Washers, of which the following is a specification.

This invention is an improvement in can washers for rinsing and sterilizing milk cans and the like.

One of the principal objects of the invention is to provide a means whereby the cream ordinarily left remaining in the milk can, after the same has been emptied, may be saved. The invention may be used to advantage in a creamery or ice cream plant or the like. As a rule in such establishments the cream or product handled is emptied from the milk cans into pasteurizers, mixers or vats, and there is left anywhere from a pint to a quart of the product remaining in the can. The heavier the produce the more adheres to the walls of the can and remains in it. The invention I provide will operate to remove all of the cream or product from the can and hence effect a material saving by utilizing the product which would otherwise be wasted.

A further object of the invention is to provide an apparatus which may also serve as a means for rinsing and sterilizing milk cans and like receptacles.

Another object is the provision of a novelly constructed stand including legs, crossbars connecting the upper ends thereof, and a pan secured to the stand by having its marginal edges coiled about the cross-bars.

Another object of the invention is to provide an apparatus of this nature which will be exceedingly simple, durable, efficient in operation and inexpensive to manufacture and maintain.

With these and other objects in view, which will become apparent as the description proceeds, the invention resides in the construction, combination and arrangement of parts hereinafter more fully described and claimed, and illustrated in the accompanying drawing in which like characters of reference indicate like parts throughout the several figures of which:

Fig. 2 represents an elevational view of the can rest and associated parts.

Fig. 3 represents a similar view of a modified form, and

Fig. 4 represents a top plan view of the apparatus.

Figure 1:
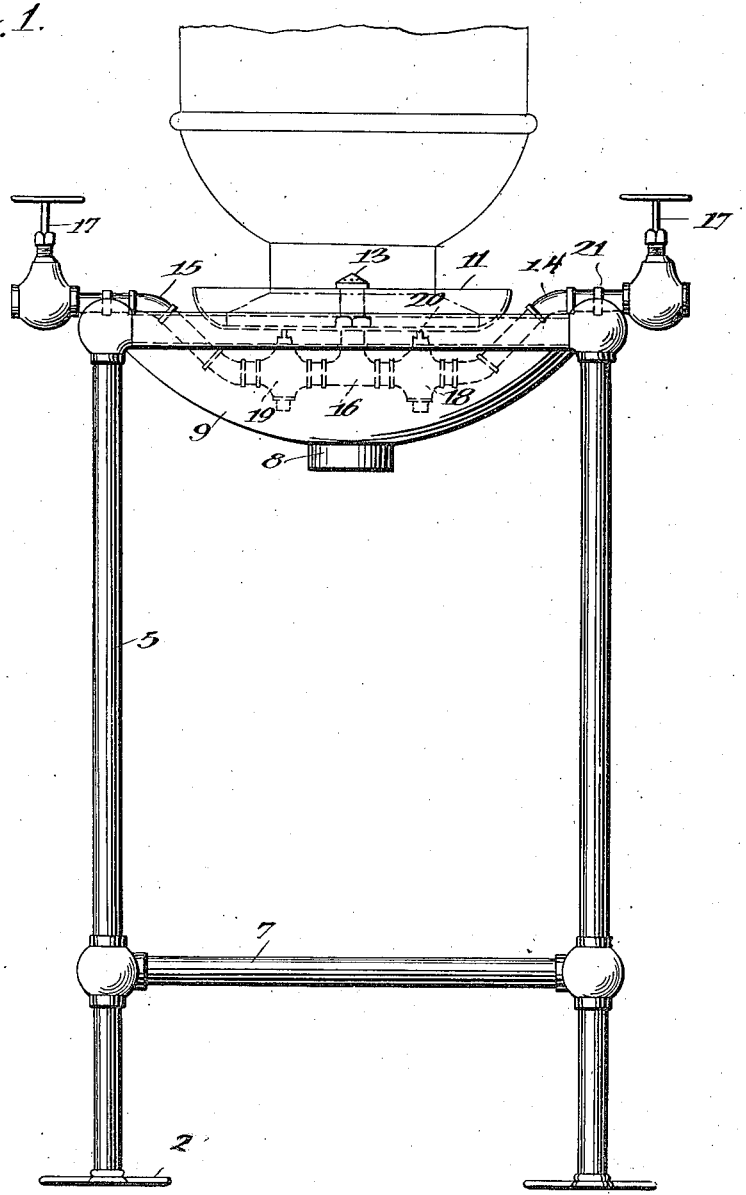
Figure 1 represents an elevational view of an apparatus constructed according to my invention.

Referring more particularly to the drawing, the apparatus includes a stand made of lengths of pipe connected by suitable fittings, the corner legs of the stand being indicated at 5. These legs at their upper ends are connected by the rails or members 6 on four sides, and adjacent their lower ends, on three sides by the members 7. The stand is thus open on one side, so that a can of relatively great capacity may be placed within the stand to catch the drip from the discharge spout 8, which directs the product of the cans from the drip pan 9 into the can or receptacle which is placed beneath the drip pan. This drip pan 9 is made of suitable material, the edges of which, as indicated at 10, are bent over the upper connecting members 6 of the stand, whereby to support the drip pan in place on the stand.

Arranged above the pan 9 is a bowl-shaped can support 11 provided with a plurality of openings 12 through which the product from the can may pass in reaching the drip pan 9. This can rest is mounted on a nozzle 13, in such manner that tilting movement of the rest relatively to the nozzle may be had. In other words the fit between the can rest and the nozzle is a loose one so that the rest may be tilted through relatively small angles, with respect to the nozzle. The nozzle 13 is in communication with a supply pipe 14, and with a supply pipe 15, through the medium of a T 16 which connects the nozzle with the inner ends of these supply pipes. The outer ends of the supply pipes communicate, one with a source of water supply and the other with a source of steam supply. For purposes of illustration we will say that the pipe 15 is connected with a source of water supply, and the pipe 14 with a steam supply. Hand operable valves 17 control the admission of water and steam to the respective supply pipes.

In each of the pipes 14 and 15, is mounted an automatic valve indicated by the numerals 18 and 19. These valves are arranged below the can rest 11, and are normally closed for cutting off communication through the pipes 14 and 15. The valves include stems 20, which project up and terminate in proximity to the can rest 11. When this rest is in normal horizontal position both valves 18 and 19 are closed.

The operation of the invention may be briefly described as follows: For removing the remaining heavy cream or condensed milk from the can after it has been emptied into a vat or pasteurizer the can will be placed up-side-down on the rest 11, and will then be tilted to the right. The weight of the can will unseat the valve 18 by depressing its stem 20, and steam will as a consequence be injected through the nozzle 18 into the can, melting the cream or condensed milk, which melted product will run from the can through the perforated bottom of the rest 11 into the drip pan, and from there will pass through the spout 8 into the receptacle below.

For rinsing a can or similar receptacle, it would be placed on the rest 12, tilted to the left, whereby to unseat the valve 19, and allow water to be injected into the can through the nozzle 13. The can would thus be thoroughly rinsed, the water running through the openings in the can rest into the drip pan and thence into a drain placed beneath the pan, or a receptacle, or onto the floor, as desired. The can may then be tilted to the right, thus unseating the valve 18 and allowing steam to be injected into the can for sterilizing the same.

The supply pipes 14 and 15 may be made of a plurality of sections of suitable form as indicated at Fig. 2, or may be made each of a single length of pipe bent in the shape indicated in Fig. 3, as found the most convenient. These pipes are secured by clips or other suitable fastenings 21, to opposite top rails of the stand. The legs 5 of the stand at the lower ends are provided with flanges 22 whereby the stand may be screwed to the floor or foundation.

The can rest bears upon the upper ends of the valve stems. The weight of a can, so long as this weight is evenly distributed on the can rest, is not sufficient to unseat both valves. However, when the can is tilted so that its weight comes over one valve or the other, the stem of the valve over which the weight comes will be depressed thus allowing that valve to be opened. The relatively loose fit between the can rest and the nozzle will allow the necessary movement of the rest relatively to the nozzle incident to the depression of the can rest in one direction or the other necessary to open one valve or the other.

Although I have described the preferred embodiments of my invention I may desire to make such changes in the construction, combination and arrangement of parts thereof, as do not depart from the spirit of the invention and the scope of the appended claim.

I claim:

A device of the character described comprising a support, a drain pan mounted rigidly thereon, a pair of pipes mounted above said pan, a T connecting said pipes, a nozzle extending upwardly from said T, a perforated bowl disposed above said T and having a hole in its bottom through which said nozzle passes whereby said bowl will be tiltable, and means operated by said tilting for controlling the passage of fluid through said pipes.

GEORGE CLIFFORD WILTSIE.